May 28, 1963

G. P. BAYNES 3,091,314

CLUTCH MECHANISM AND THE LIKE

Filed Jan. 30, 1961

INVENTOR.
GENE P. BAYNES
BY
William P. Hickey
ATTORNEY

May 28, 1963 G. P. BAYNES 3,091,314
CLUTCH MECHANISM AND THE LIKE
Filed Jan. 30, 1961 4 Sheets-Sheet 2

INVENTOR.
GENE P. BAYNES
BY
William P. Hickey
ATTORNEY

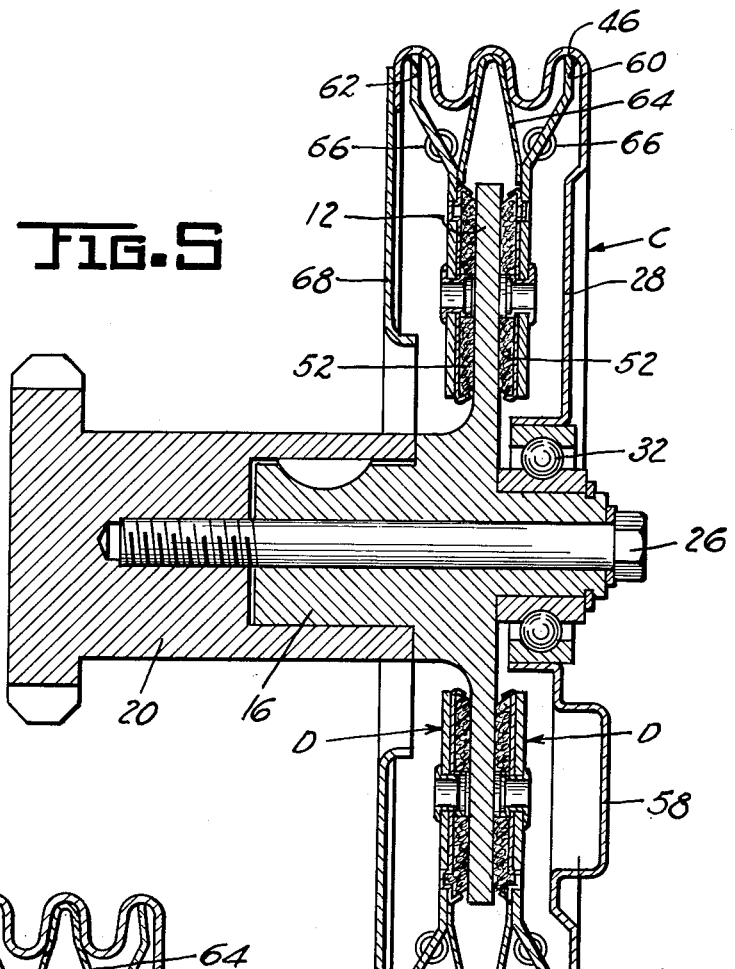
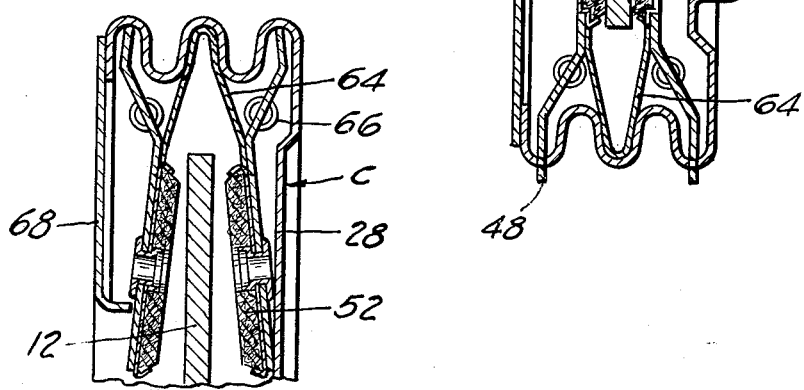

United States Patent Office 3,091,314
Patented May 28, 1963

3,091,314
CLUTCH MECHANISM AND THE LIKE
Gene P. Baynes, Green Island, Troy, N.Y., assignor to The Bendix Corporation, Troy, N.Y., a corporation of Delaware
Filed Jan. 30, 1961, Ser. No. 85,919
17 Claims. (Cl. 192—104)

The present invention relates to clutch mechanism generally; and more particularly to clutch means which performs an automatic regulating function with respect to the speed of the driven member. The present invention is a continuation in part of U.S. patent application 773,909 filed November 14, 1958, now abandoned.

An object of the present invention is the provision of a new and improved construction of a clutch mechanism which is simple in configuration, inexpensive to make and assemble, and is efficient in its operation.

Another object of the present invention is the provision of a construction which can be modified slightly to produce various control functions.

A more detailed object of the present invention is the provision of a new and improved speed controlling clutch having "engaging elements" on which centrifugal force acts to move them to their disengaged position when a generally predetermined speed is exceeded, and on which "engaging elements" springs act to return them to their engaging position below said generally predetermined speed.

The invention resides in certain constructions, and combinations, and arrangements of parts; and further objects and advantages will become apparent to those skilled in the art to which the invention relates from the following description of several preferred embodiments described with reference to the accompanying drawings forming a part of this specification, and in which:

FIGURE 5 is a cross sectional view similar to FIGURE 1 but showing still another embodiment of the invention; and FIGURE 6 is a fragmentary cross sectional view showing a portion of the embodiment of FIGURE 5 in its normal at rest position.

Figure 1:
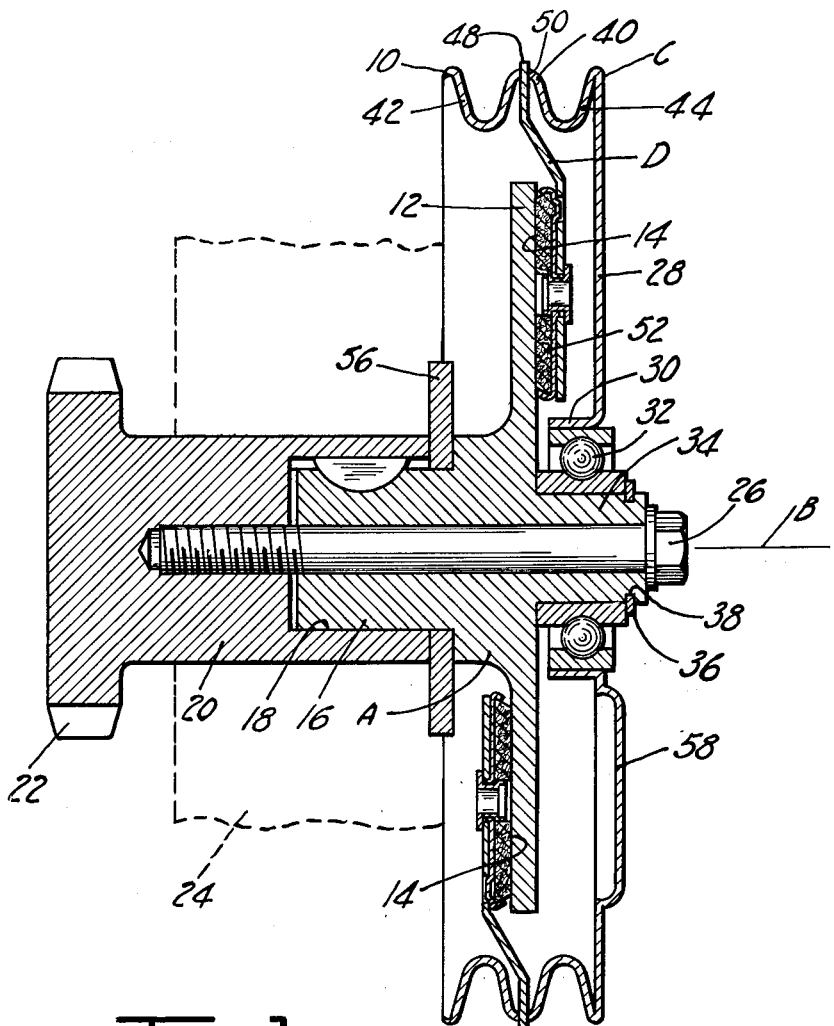
FIGURE 1 is a cross sectional view of a mechanical speed control device employing principles of the present invention.
Figure 2:
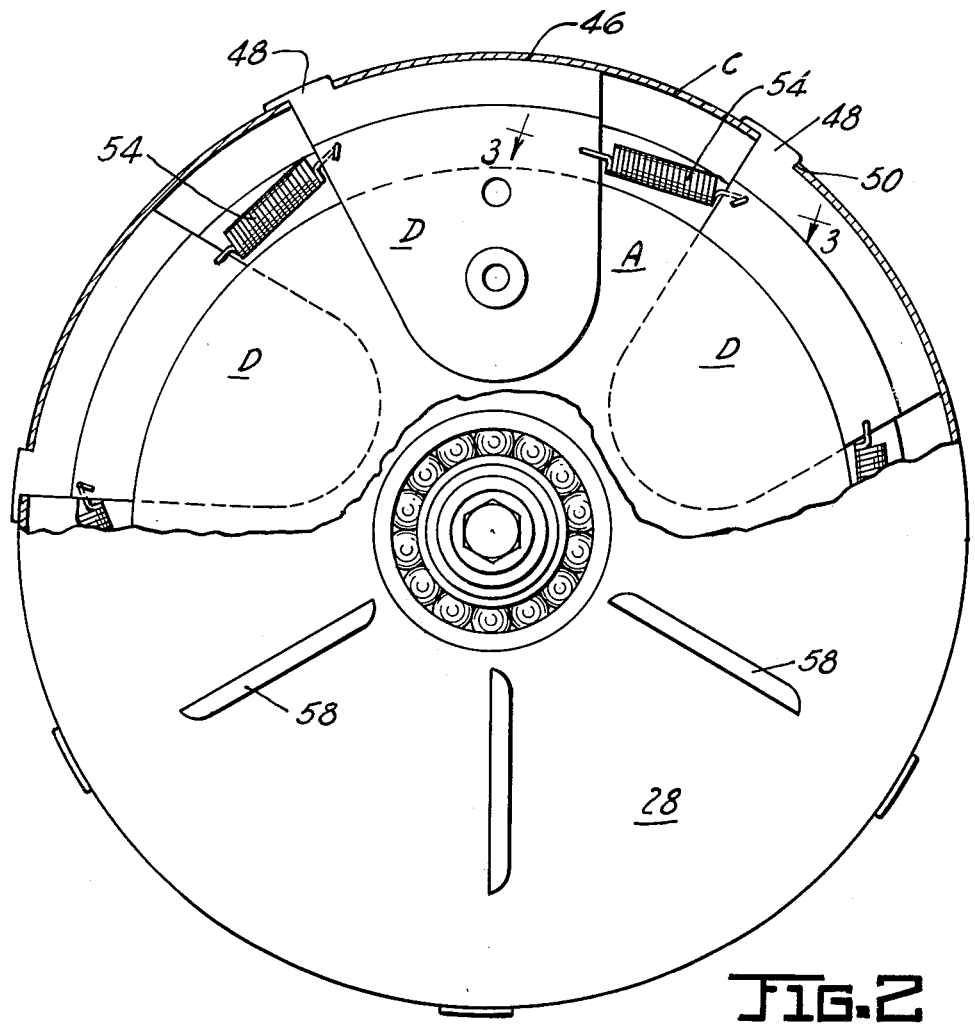
FIGURE 2 is a right end view of the mechanism shown in FIGURE 1 with portions broken away to better illustrate the internal structure.

The speed control mechanism shown in FIGURES 1 and 2 of the drawings generally comprises a generally disk shaped driving member A that is rotatable about a longitudinal axis B, a generally annular or cup-shaped driven member C that is positioned concentric within the driving member A with its outer portion 10 positioned generally radially outwardly of the disk portion 12 of the driving member A, and a plurality of generally radially inwardly extending fingers that are pivotally carried by the outer portion 10 of the driven member C and which are provided with friction engaging surfaces 14 which engage the disk portion 12 to drive the driven member C.

The driving member A and driven member C may be mounted and driven in any suitable manner; and, as shown in the drawing, the generally disk-shaped driving member A is provided with an axially extending boss 16 on one side thereof which is received in a receiving bore 18 in a section of shaft 20, the opposite end of which is provided with a gear 22 by which the shaft 20 may be rotatably driven in any suitable manner. The section of shaft 20 is suitably journalled in a housing 24 by bearing means as, for example, roller bearings not shown, and the axially extending boss 16 of the driving member is suitably keyed to the shaft 20 and is held in place by an axially extending bolt 26 which extends through the disk and boss portions of the driven member A and is threaded into the shaft 20.

Likewise, the annular driven member C may be supported and journalled in any suitable manner and, as shown in the drawing, is rotatably mounted with respect to the longitudinal axis B by means of an end cover plate 28 that is an integral part of the driven member C. The outer portion 10 of the driven member C is generally corrugated for reasons which will later be described and is then bent radially inwardly on one end thereof to provide the end cover plate section 28. The radially inner end of the cover plate 28 is provided with an axially extending flange 30 by bending its radially inner end axially inwardly, and a roller bearing 32 is interpositioned between a small diameter boss 34 on the driving member A and the axially extending flange 30 of the end cover plate 28. The roller bearing 32 is pressed into the axially extending flange 30 to rigidly support the driven member C, and the roller bearing 32 is held in place up against the disk portion 12 of the driving member by means of a snap ring 36 which abuts the opposite end of the roller bearing 32 and is partially received in a groove 38 in the boss 34.

As previously mentioned the outer portion 10 of driven member C is preferably corrugated to provide a radially outwardly extending projection 40 in the outer portion 10 which generally overlies the disk portion 12 of the driving member A, and a pair of radially inwardly extending recesses, corrugations, or valleys 42 and 44 in its outer surface which lie on opposite sides of the projection 40. The radially inwardly extending recesses 42 and 44 provide a convenient arrangement for receiving a pair of V belts, not shown, by which torque from the driven member C may be transmitted to any suitable mechanism that it is desired to operate.

The radially inwardly extending fingers D may be pivotally connected to the driven member C in any suitable manner, but as seen in the drawing is very neatly accomplished by providing bearing areas 46 on the radially outer edges of the fingers or levers D which are received in the projection 40. The pivotal connection between the fingers D and the driven member C is made capable of transmitting torque to the driven member C by providing a hook-shaped projection 48 adjacent the trailing edge of each of the fingers D—which hook-shaped projection extends through an opening or hole 50 in the projection 40 and engages the outer surface of the outer portion 10 of the driven member C. The driving member A is adapted to be driven in a clockwise direction as seen in FIGURE 2 at a rate which will substantially be at or exceed the speed of rotation of the driven member C. It will, therefore, be seen that torque transmitted to the fingers D by the driving member A produces a moment upon the fingers which produces a tension upon the hook-shaped projection 48 and bearing upon the remaining portion of the bearing areas 46.

The fingers D can, of course, be made to only engage one side of the disk portion 12, but, in the preferred arrangement shown in the drawing, will be alternately spaced around the disk portion 12 so that adjacent ones of the fingers D will engage opposite sides of the disk portion 12. Likewise, the pivotal support between the fingers D and the outer portion 10 of the driven member C may be moved somewhat laterally with respect to the disk portion 12, but in the preferred embodiment shown in the drawing are each located in a plane which substantially passes through the center of the disk portion 12. The fingers D, therefore, are appropriately bent from their bearing areas 46 to a position where its inner end is spaced from the appropriate face of the disk portion 12 by a distance sufficient to receive a friction producing element 52 that is adapted to engage the face of the disk portion 12. The friction producing elements shown in the drawing are generally circular in section and are of the long wearing heat resistant type shown and described in the Stedman et al. Patent No. 2,784,-105. The friction producing elements 52 may be fastened to the fingers D in any suitable manner and are preferably riveted in the manner described in the above referred to patent.

It will be seen that the center of the mass, or center of gravity, of the friction producing elements 52 is positioned slightly laterally with respect to the bearing areas 46 of the fingers D, so that the imaginary plane passing through the center of gravity and bearing area 46 of each finger forms an acute angle with respect to a radial plane; and so that rotation of the driven member C and the fingers D causes a moment to be produced upon the fingers D which tends to bias the friction producing elements 52 out of engagement with the driving member A. In order to produce driving engagement between the friction producing elements 52 and the disk portion 12, it is necessary, therefore, to provide resilient means for holding the elements 52 into engagement with the disk portion 12 of the driving member A. The fingers D with their friction producing elements 52 may be biased into engagement with the disk 12 in any suitable manner, but in the preferred embodiment shown in the drawing is very neatly accomplished by placing adjacent ones of the fingers D in opposite sides of the disk portion 12, and positioning a tension coil spring 54 between the leading edge of each finger and the adjacent trailing edge of the forwardly positioned finger. A further advantage is had by inclining the line of force of the coil springs 54 slightly forward and radially outwardly so that the tension of the coil springs 54 also tends to hold the bearing areas 46 of the fingers D into engagement with the outer portion 10 of the driven member C. This may best be seen in the upper portion of FIGURE 2 of the drawings. It will further be seen that inasmuch as the springs 54 connect alternate members on opposite sides of the disk portion 12, an axial force is exerted upon each of the fingers D which it connects, tending to bias each of the fingers into friction producing engagement with the disk portion 12 of the driving member A.

It will also be seen that axial alignment of parts is not critical because of the manner in which the fingers D are mounted.

As previously indicated, it is inherent in the structure previously described that the driven member C produces a moment upon the fingers D which urges them out of engagement with the driving member A. Assuming that the driving member A is being driven at a speed in excess of that which it is desired to drive the driven member C, engagement of the friction producing elements 52 with the disk portion 12 causes torque to be transmitted to the driven member C and its speed of rotation to be increased. When the speed of rotation of the driven member C reaches or slightly exceeds the control speed at which it is desired to prevent the driven member C from exceeding, the centrifugal force upon the fingers D will be sufficient to overcome the tension of the coil springs 54 and cause the friction producing elements 52 to move out of engagement with the disk portion 12 of the driving member A. It will further be seen from the drawing that as the fingers D move away from the disk portion 12 of the driving member A, a continually increasing moment is provided with respect to the point of attachment of the fingers with the outer portion 10 of the driven member, so that the forces tending to urge the friction producing elements 52 out of engagement with the disk 12 continue to increase to provide a snap actuation which thereafter quickly lifts the friction producing elements from the disk portion 12. Maximum movement of the fingers D away from the disk portion 12 may be limited by stop means in any suitable manner, as, for instance, by engagement of the fingers with the cover plate 28 on one side of the disk and by an annular stop 56 provided on the other side of the disk portion 12. In order to help dissipate the heat created during engagement of the friction elements 52 with the driving member A, suitable cup-shaped openings 58 will preferably be provided in the end cover plate 28 to create a circulation of air past the friction elements 52 and the disk portion 12 of the mechanism.

Figure 3:
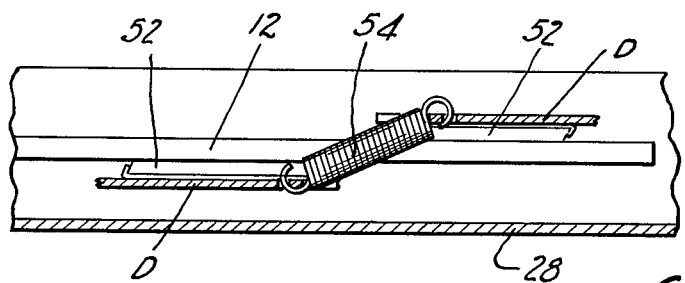
FIGURE 3 is a fragmentary sectional view taken generally upon the lines 3—3 in FIGURE 2.
Figure 4:
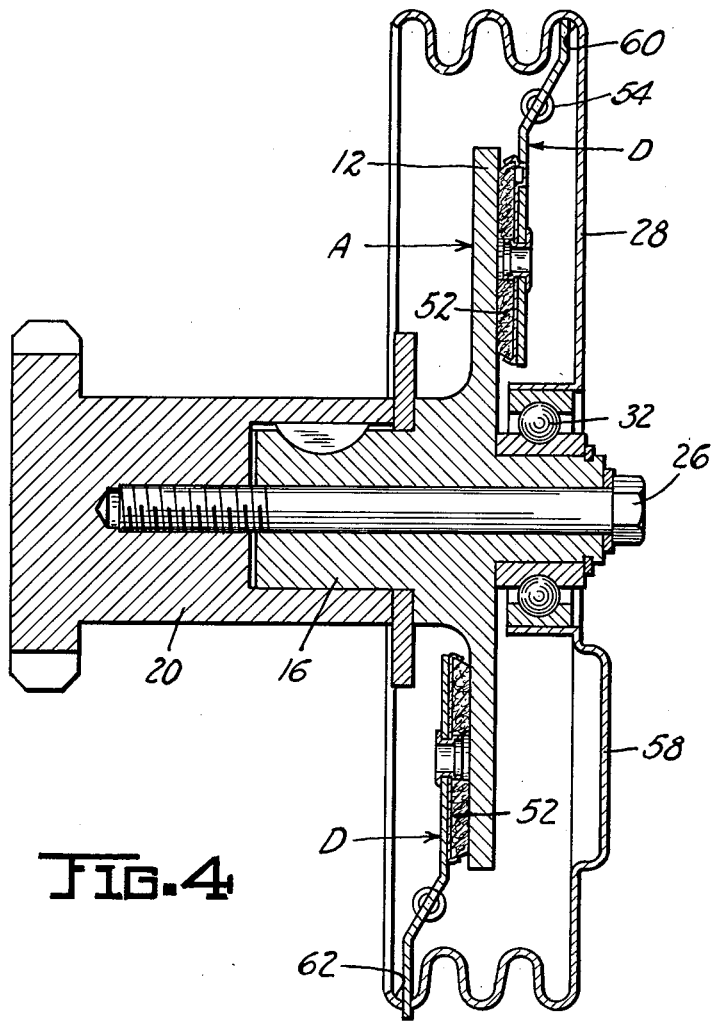
FIGURE 4 is a fragmentary cross sectional view similar to FIGURE 1 but showing another embodiment of the invention.

It will be obvious to those skilled in the art that the details of construction described above can be altered slightly so that the resulting clutch structure will perform different functions. In the embodiment shown in FIGURE 4 of the drawings, the corrugations in the driven members C are slightly axially extended, and the outer ends of the radial fingers D are positioned in the recesses that are spaced axially outwardly of the respective friction surfaces of the driving member A. In the upper portion of FIGURE 4, for example, the radially outer end of the finger D is bent away from the driving member A and is received in the groove 60 that lies adjacent the end cover 28 of the driven member C. The radial finger D is otherwise identical with that shown and described in the previous embodiment. The radial fingers D that are positioned on the opposite side of the disk portion 12 have their radially outer ends bent away from the disk 12 in the opposite axial direction and are received in the groove 62. The fingers D which are positioned on opposite sides of the disk 12 are fastened to the driven member C by the identical hook arrangement previously described, and are connected together by means of coil springs that are similar to those shown in FIGURES 2 and 3. In the embodiment shown in FIGURE 4, the coil springs 54 will be somewhat weaker than those used in the embodiments previously described; so that the friction elements, in their static or at rest condition 52 are caused to engage the disk 12 with only a slight holddown force. As the rotation of the disk 12 is speeded up from its at rest condition, the frictional drag between the elements 52 and the disk 12 will produce a slight driving torque on the driven member C. Inasmuch as the center of gravity of the friction elements 52 is located between the driving disk 12 and the outer ends of the fingers D which bear against the driven member C, centrifugal force causes the friction elements 52 to bear against the frictional surfaces of the driving member A with increasing force. The arrangement shown in FIGURE 4 will have utility in a driving connection between an electric motor powered driving member A, and a rotating device having considerable inertia. With the device shown in FIGURE 4, the electric motor can be started under a slight load; and as the electric motor is brought up to speed, more frictional force will be applied between the frictional elements D and driving member A to gradually speed up the driven member until it reaches a no slip condition.

Still other arrangements can be made of the elements heretofore described; and one such arrangement is shown in FIGURE 5 of the drawings. The embodiment shown in FIGURE 5 is very similar to that seen in FIGURE 4; and differs principally therefrom, in that the fingers D are held out of engagement with the disk 12 in the static condition of the device by means of U-shaped springs 64 that are riveted to the center corrugation of the driven member C. The fingers D on opposite sides of the disk 12 are positioned directly opposite one another, and the U-shaped spring 64 is positioned directly therebetween, so that the friction elements 52 are normally biased out of engagement with the disk 12. The fingers D are held in their respective grooves by means of the coil springs 66 and hook arrangement previously described. Inasmuch as the embodiment shown in FIGURE 5 is to perform a slightly different function from that of the device seen in FIGURE 4, the coil springs 66 are connected to the adjacent fingers on the same side of the disk 12, to produce a force upon the fingers D that results in tension on the hook shaped projection 48 and bearing upon the remaining portion of the bearing areas 46. Alternatively the springs 66 could be fastened to the member C. An annular stop plate 68 is suitably riveted to the open end of the cup shaped member C (left hand side as seen in FIGURE 5). The U-shaped springs 64 normally biased the fingers D on opposite sides of the disk 12 against the stop plate 68 and closed end 28 of the driven member C respectively. In the embodiment shown in FIGURE 5, the outer member C will be the driving member and the disk shaped member A will be the driven member; and as the driving member C increases in speed, the centrifugal force on the friction elements 52 causes them to compress the U-springs 64 and move upwardly into engagement with the disk 12. This permits the outer member C to be speeded up from its at rest position under no load, and allows a gradually increasing torque to be transmitted to the driven member.

Still other modifications can be made by making slightly different arrangements of one or more of the elements above described; and these arrangements may be used to perform slightly different functions.

While the invention has been described in considerable detail, I do not wish to be limited to the particular constructions shown and described, and it is my intention to cover hereby all novel adaptations, modifications and arrangements thereof which come within the practice of those skilled in the art to which the invention relates.

I claim:

1. In self-actuating clutch mechanism and the like: a generally disk shaped member having opposite side friction surfaces rotatable about an axis of revolution; an annular outer member having an inside surface positioned radially outwardly of said disk shaped member; a pair of friction producing members respective ones of which are positioned on opposite sides of said disk shaped member with their radially outer ends having a point of bearing against said inside surface of said annular outer member and the radially inner end of said friction members having a friction producing surface for engaging the adjacent surface of said disk shaped member, each friction member having a center of gravity and being inclined to said disk shaped member so that the line of centrifugal force from its center of gravity is off center with respect to said point of bearing of the friction member on said annular outer member, the friction members on opposite sides of said disk-shaped member being inclined in opposite axial directions when disengaged from said disk-shaped member; and means transmitting biasing force in an axial direction between the friction members on opposite sides of said disk shaped member.

2. In self-actuating clutch mechanism and the like: a generally disk shaped member having opposite side friction surfaces rotatable about an axis of revolution; an annular outer member having inside and outside surfaces positioned radially outwardly of said disk shaped member; a pair of friction members respective ones of which are positioned on opposite sides of said disk-shaped member with their radially outer ends having a point of bearing against said inside surface of said annular outer member and the radially inner end of said friction members having a friction producing surface for engaging the adjacent surface of said disk shaped member, each friction member having a center of gravity and being inclined toward said disk shaped member so that the line of centrifugal force from its center of gravity is off center with respect to said point of bearing of the friction member on said annular outer member; and means transmitting biasing force in an axial direction between the friction members on opposite sides of said disk-shaped member.

3. In self-actuating clutch mechanism and the like: a generally disk-shaped member having opposite side friction surfaces rotatable about an axis of revolution; an annular outer member positioned radially outwardly of said disk shaped member and having an inside surface with annular grooves therein spaced on opposite sides of said generally disk shaped member; a pair of friction members respective ones of which are positioned on opposite sides of said disk shaped member with their radially outer ends having a point of bearing in respective grooves on opposite sides of said disk shaped member and the radially inner end of said friction members having a friction producing surface for engaging the adjacent surface of said disk shaped member, each friction member having a center of gravity and being inclined to said disk shaped member so that the line of centrifugal force from its center of gravity is off center with respect to said point of bearing of the friction member on said annular outer member, the friction members on opposite sides of said disk shaped member being inclined in opposite axial directions when disengaged from said disk-shaped member; and means transmitting biasing force in an axial direction between the friction members on opposite sides of said disk-shaped member.

4. In self-actuating clutch mechanism and the like: a generally disk shaped member having opposite side friction surfaces rotatable about an axis of revolution; an annular outer member positioned radially outwardly of said disk-shaped member and having an inside surface with annular grooves therein spaced on opposite sides of said generally disk shaped member; a pair of friction members respective ones of which are positioned on opposite sides of said disk shaped member with their radially outer ends having a point of bearing in the respective groove of said annular outer member and the radially inner end of said friction members having a friction producing surface for engaging the adjacent surface of said disk shaped member, each friction member having a center of gravity and being inclined toward said disk shaped member so that the line of centrifugal force from its center of gravity is off center with respect to said point of bearing of the friction member on said annular outer member, the friction members on opposite sides of said disk shaped member being angularly offset relative to each other when disengaged from said disk-shaped member; and tension springs positioned outwardly of said disk shaped member and connecting said adjacent friction members on opposite sides of said disk-shaped member.

5. In speed control mechanism, an annular radially outer member having a central axis of rotation and an inside surface, a radially inner disk-shaped member concentric with said outer member and rotatable about said central axis in a given direction, said annular outer member having a plurality of openings therethrough spaced therearound generally radially with respect to said inner member, a plurality of generally radially inwardly extending members bearing against said inside surface of said annular outer member, adjacent ones of said inwardly extending members each having a friction producing surface for abutting said disk-shaped member, the friction surface of one radially inwardly projecting member being positioned for abutment with one side of said disk-shaped member and the friction surface of said adjacent radially inwardly projecting member being positioned for abutment with the other side of said disk-shaped member, said radially inwardly projecting members each having a hook adjacent its trailing edge which projects through one of said openings through said outer member, and a coil spring connecting the leading edge of one of said radially inwardly extending members to the trailing edge of the adjacent radially inwardly extending member, whereby said spring biases said radially inwardly extending members toward engagement with said disk-shaped inner member.

6. In speed control mechanism, an annular radially outer member having a central axis of rotation, a radially inner disk-shaped member concentric with said outer member and rotatable about said central axis in a given direction, said annular outer member having a plurality of openings therethrough spaced therearound generally radially outwardly with respect to said inner member, a plurality of generally radially inwardly extending members bearing against the inside surface of said annular outer member, adjacent ones of said inwardly extending members each having a friction producing surface for abutting said disk-shaped member, the friction surface of one radially inwardly projecting member being positioned for abutment with one side of said disk-shaped member and the friction surface of said adjacent radially inwardly projecting member being positioned for abutment with the other side of said disk-shaped member, said radially inwardly projecting members each having a hook adjacent its trailing edge which projects through one of said openings through said outer member, and a coil spring connecting the leading edge of one of said radially inwardly extending members to the trailing edge of the adjacent radially inwardly extending member, said coil spring being connected to said trailing edge at a point closer to said outer member than is its connection to said leading edge, whereby said spring biases said radially inwardly extending members toward engagement with said disk-shaped inner member and biases the leading portion of said radially inwardly extending member into engagement with said outer member.

7. In speed control mechanism, a generally disk-shaped member having generally opposed frictional surfaces rotatable about an axis of revolution in a given direction, an annular outer member positioned radially outwardly from said surfaces, means including friction surfaces positioned for engagement with said opposed frictional surfaces of said disk-shaped member, said means including at least a pair of levers one end of each having a point of bearing against said outer member in the region radially outwardly of said disk-shaped member and the other end of one of said levers causing one of said friction surfaces to engage one frictional surface of said disk-shaped member and the other end of the other of said levers causing the other of said friction surfaces to engage the other frictional surface of said disk-shaped member, the imaginary lines connecting the center of gravity and said point of bearing of the respective levers forming a slight radially inwardly diverging acute angle with respect to a normal to said axis of rotation of said disk-shaped member, and means biasing said levers toward said disk-shaped member, whereby when said surfaces engage said disk-shaped member most of the centrifugal force of said levers is taken in bearing by said outer member and only a small fraction of that force is opposed by said biasing means and whereby a snap actuation is produced as said levers move away from said disk-shaped member.

8. In speed control mechanism, a generally disk-shaped member having generally opposed frictional surfaces rotatable about an axis of revolution in a given direction, an annular outer sheet metal member having a radially outwardly projecting corrugation positioned radially outwardly from said surfaces, means including friction surfaces positioned for engagement with said opposed frictional surfaces of said disk-shaped member, said means including at least a pair of levers one end of each having a point of bearing against said outer member in said radially outwardly projecting corrugation and the other end of one of said levers causing one of said friction surfaces of said means to engage one of said opposed frictional surfaces of said disk-shaped member and the other end of the other of said levers causing the other of said friction surfaces of said means to engage the other of said opposed frictional surfaces of said disk-shaped member, the imaginary lines connecting the center of gravity and said point of bearing of the respective levers forming a slight radially inwardly diverging acute angle with respect to a normal to said axis of rotation of said disk-shaped member, and means biasing said levers toward said disk-shaped member, whereby when said surfaces engage said disk-shaped member most of the centrifugal force of said levers is taken in bearing by said outer member and only a small fraction of that force is opposed by said biasing means and whereby a snap actuation is produced as said levers move away from said disk-shaped member.

9. In speed control mechanism, a generally disk-shaped member having generally opposed frictional surfaces rotatable about an axis of revolution in a given direction, an annular outer sheet metal member having a radially outwardly projecting corrugation positioned radially outwardly from said surfaces, and an adjacent radially inwardly projecting corrugation providing V-belt drive receiving surfaces, means including friction surfaces positioned for engagement with said opposed frictional surfaces of said disk-shaped member, said means including at least a pair of levers one end of each having a point of bearing against said outer member in said radially outwardly projecting corrugation and the other end of one of said levers causing one of said friction surfaces of said means to engage one of said opposed friction surfaces of said disk-shaped member and the other end of the other of said levers causing the other of said friction surfaces of said means to engage the other of said opposed friction surfaces of said disk-shaped member, the imaginary lines connecting the center of gravity and said point of bearing of the respective levers forming a slight radially inwardly diverging acute angle with respect to a normal to said axis of rotation of said disk-shaped member, and means biasing said levers toward said disk-shaped member, whereby when said surfaces engage said disk-shaped member most of the centrifugal force of said levers is taken in bearing by said outer member and only a small fraction of that force is opposed by said biasing means and whereby a snap actuation is produced as said levers move away from said disk-shaped member.

10. In speed control mechanism, a generally disk-shaped member having generally opposed frictional surfaces rotatable about an axis of revolution in a given direction, an annular outer sheet metal member having a radially outwardly projecting corrugation positioned radially outwardly from said surfaces and an adjacent radially inwardly projecting corrugation providing V-belt drive receiving surfaces, means including friction surfaces positioned for engagement with said opposed frictional surfaces of said disk-shaped member, said means including at least a pair of levers one end of each having a point of bearing against said outer member in said radially outwardly projecting corrugation and the other end of one of said levers causing one of said friction surfaces of said means to engage one of said frictional surfaces of said disk-shaped member and the other end of the other of said levers causing the other of said frictional surfaces of said means to engage the other of said opposed frictional surfaces of said disk-shaped member, the imaginary lines connecting the center of gravity and said point of bearing of the respective levers forming a slight radially inwardly diverging acute angle with respect to a normal to said axis of rotation of said disk-shaped member, and a plurality of tension coil springs one end of which is attached to the trailing edge of one of said levers and the opposite end of which is attached to the leading edge of the adjacent lever with the body portion of the spring crossing over between said levers radially outwardly of said disk-shaped member, whereby when said surfaces engage said disk-shaped member most of the centrifugal force of said levers is taken in bearing by said outer member and only a small fraction of that force is opposed by said biasing means and whereby a snap actuation is produced as said levers move away from said disk-shaped member.

11. In clutch mechanism and the like: an inner member having a central axis of rotation and a generally radially extending friction surface; an annular outer member having an inside surface concentric with said inner member and rotatable relative thereto about said axis of rotation, said annular outer member having a plurality of openings therethrough spaced about said axis of rotation; a plurality of generally radially inwardly extending members standing against said inside surface of said annular outer member and adapted to abut said generally radially extending friction surface, each radially extending member having a hook adjacent one side edge thereof and extending through a respective opening through said annular outer member; and spring means yieldably holding the opposite side of each generally radially extending member in place against said annular outer member, whereby said clutch mechanism can be quickly and inexpensively assembled.

12. In clutch mechanism and the like: an inner member having a central axis of rotation and a generally radially extending friction surface; an annular outer member having an inside surface concentric with said inner member and rotatable relative thereto about said axis of rotation, said annular outer member having a plurality of openings therethrough spaced about said axis of rotation; a plurality of generally radially inwardly extending members standing against said inside surface of said annular outer member and adapted to abut said generally radially extending friction surface, each radially extending member having a hook adjacent one side edge thereof and extending through a respective opening through said annular outer member; and spring means connecting the opposite side of each generally radially extending member to the edge containing the hook of the adjacent generally radially extending member to hold said radially extending members in place against said annular outer member, whereby said clutch mechanism can be quickly and inexpensively assembled.

13. In clutch mechanism and the like: an inner member having a central axis of rotation and a generally radially extending friction surface; an annular sheet metal member having inside and outside surfaces positioned outwardly of said inner member and rotatable about said axis of rotation, said annular member being corrugated to provide alternate valleys in its inner and outer surfaces; a plurality of generally radially inwardly extending members, the outer end of each radial member standing in an internal valley of said annular outer member and the inner end of said radially extending members being adapted to abut said generally radially extending friction surface; hold-down means loosely holding and pivoting said radial members against the surface of said internal grooves, said radial members being biased against said friction surface of said inner member during rotation of said annular member for a frictional drive therewith, and said outside valleys of said annular outer member being shaped to receive torque transmitting V-belts.

14. In clutch mechanism and the like: an inner member having a central axis of rotation and a generally radially extending friction surface; a cup-shaped sheet metal member rotatable about said axis concentric with said inner member and having a sidewall portion having inner and outer surfaces positioned radially outwardly of said inner member, said sidewall portion being corrugated to provide circumferentially extending grooves in said inner and outer surfaces; a plurality of generally radially extending friction members the outer ends of which are loosely held against the surface of said internal grooves for pivotal movement toward and away from said friction surface of said inner member, said radial members being biased against said friction surface during rotation of said cup-shaped member, and the radially extending bottom portion of said cup-shaped member being slotted and bent outwardly into air scoops for producing a cooling flow of air through said cup-shaped member.

15. In a clutch mechanism and the like: an inner member having a central axis of rotation and having a generally radially extending friction surface; an annular outer member having an inside surface concentric with said inner member and rotatable relative thereto about said axis of rotation, a plurality of generally radially inwardly extending members bearing against said inside surface of said annular outer member and adapted to abut said generally radially extending friction surface, each of said generally radially extending members having a center of gravity positioned to one side of said generally radially extending friction surface, said generally radially extending members bearing against said annular outer member at points spaced in one axial direction of the radial plane containing said center of gravity of said radially extending members, and spring means biasing said radially extending members in the opposite axial direction.

16. In a clutch mechanism and the like: an inner member having a central axis of rotation and having a generally radially extending friction surface; an annular outer member having an inner surface concentric with said inner member rotatable relative thereto about said axis of rotation, said annular outer member having an annular groove extending around said inner surface; a plurality of generally radially inwardly extending members standing in said groove of said annular outer member and adapted to abut said generally radially extending friction surface, each of said generally radially extending members having a center of gravity positioned in one axial direction from the plane of said annular groove; and spring means biasing said generally radially extending members in the opposite axial direction.

17. In a clutch mechanism and the like: an inner member having a central axis of rotation and having a generally radially extending friction surface; an annular sheet metal member having inner and outer surfaces positioned outwardly of said inner member and rotatable relative thereto about said axis of rotation, said annular outer member being corrugated to provide alternate circumferentially extending valleys in said inner and outer surfaces; a plurality of generally radially inwardly extending members, the outer end of each generally radially extending member standing in an internal valley of said annular outer member and the inner end of said radially extending members being adapted to abut said generally radially extending friction surface, said radially extending members having a center of gravity that is positioned in one axial direction from the plane of said internal valley in which the outer ends of said generally radially extending members are positioned; and means biasing said radially extending members in the opposite axial direction.

References Cited in the file of this patent

UNITED STATES PATENTS

| 766,552 | Sturtevant et al. | Aug. 2, 1904 |
| 2,837,193 | Wilder | June 3, 1958 |
| 2,963,135 | Weir | Dec. 6, 1960 |

FOREIGN PATENTS

| 589,037 | France | Feb. 14, 1925 |
| 727,409 | Germany | Nov. 2, 1942 |